Oct. 12, 1954
M. D. KOONTZ
2,691,533
LOAD-DISTRIBUTING ARRANGEMENT FOR
TRACTOR-TRAILER COMBINATIONS
Filed June 16, 1950
3 Sheets-Sheet 1
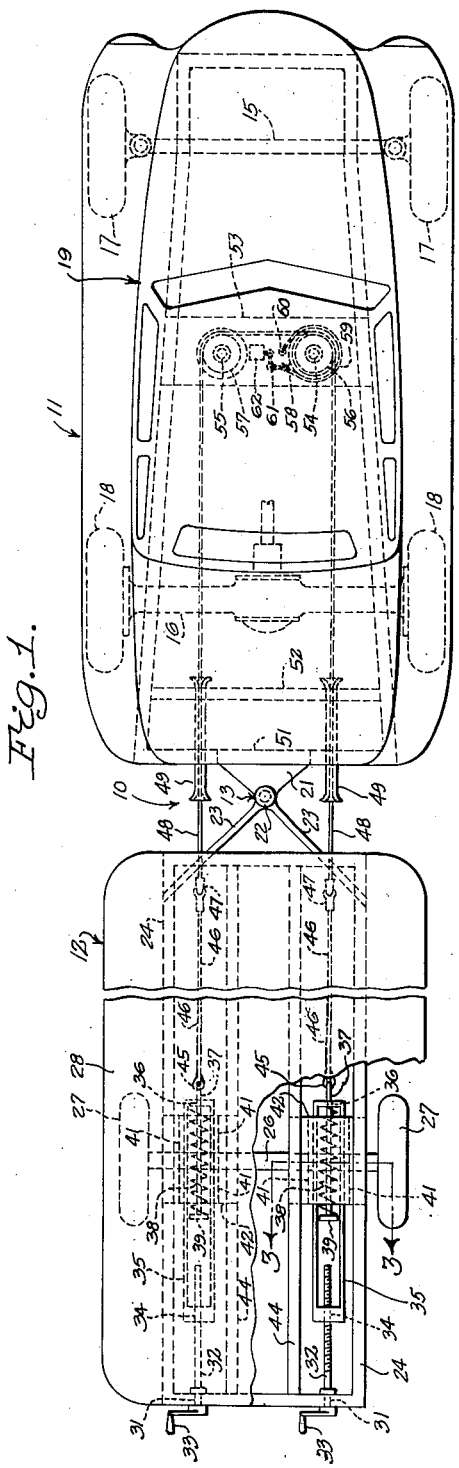
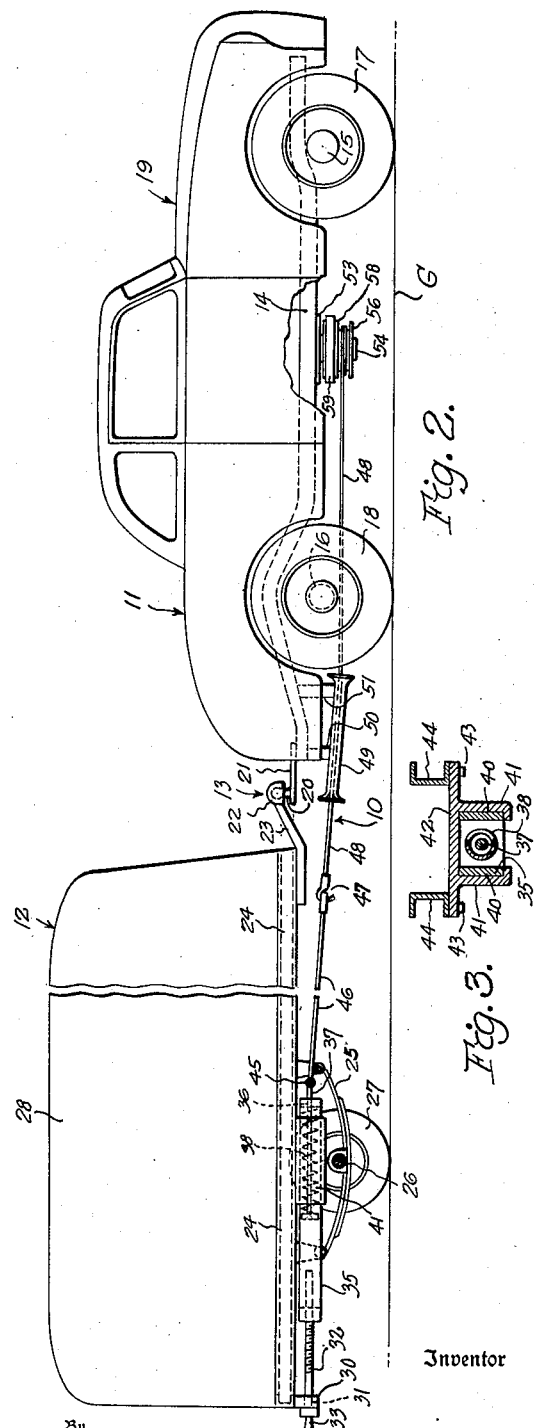
Inventor
Marshall D. Koontz
Barthel & Bugbee Attorneys Oct. 12, 1954
M. D. KOONTZ
2,691,533
LOAD-DISTRIBUTING ARRANGEMENT FOR
TRACTOR-TRAILER COMBINATIONS
Filed June 16, 1950
3 Sheets-Sheet 2
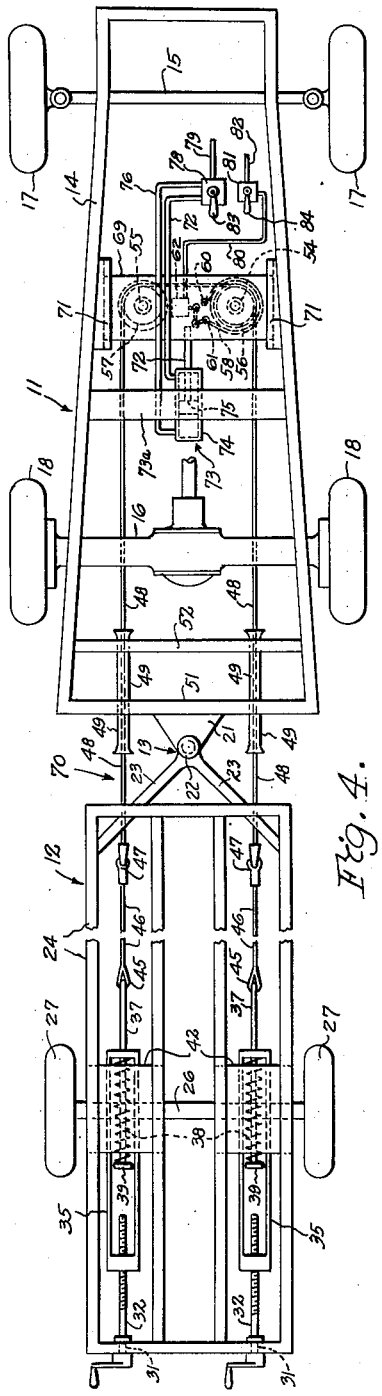
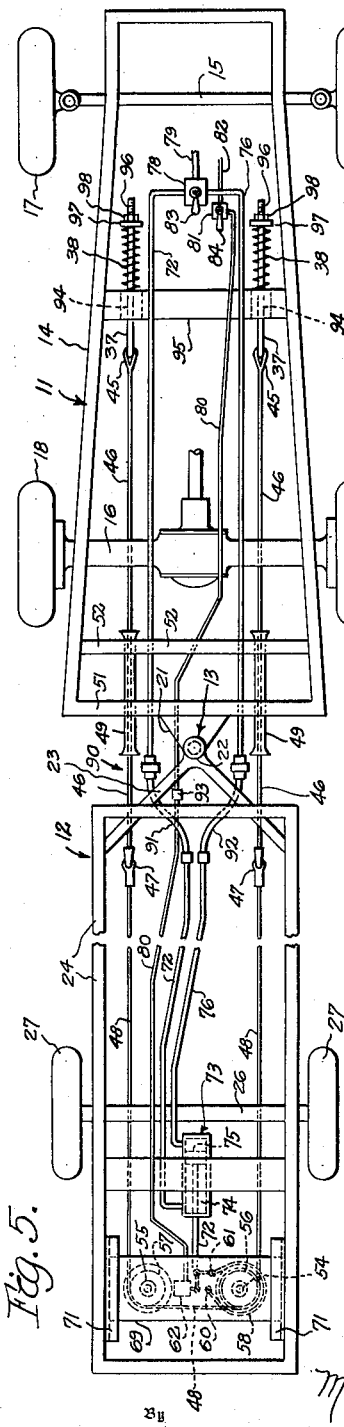
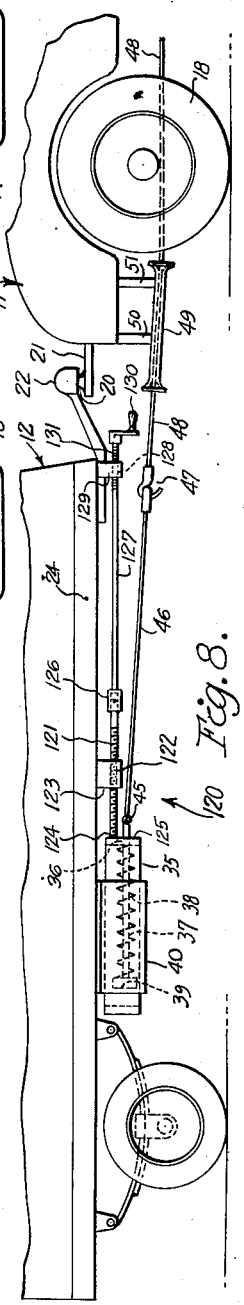
Inventor
Marshall D. Koontz
Barthel & Bugbee
Attorneys Oct. 12, 1954
M. D. KOONTZ
2,691,533
LOAD-DISTRIBUTING ARRANGEMENT FOR
TRACTOR-TRAILER COMBINATIONS
Filed June 16, 1950
3 Sheets-Sheet 3
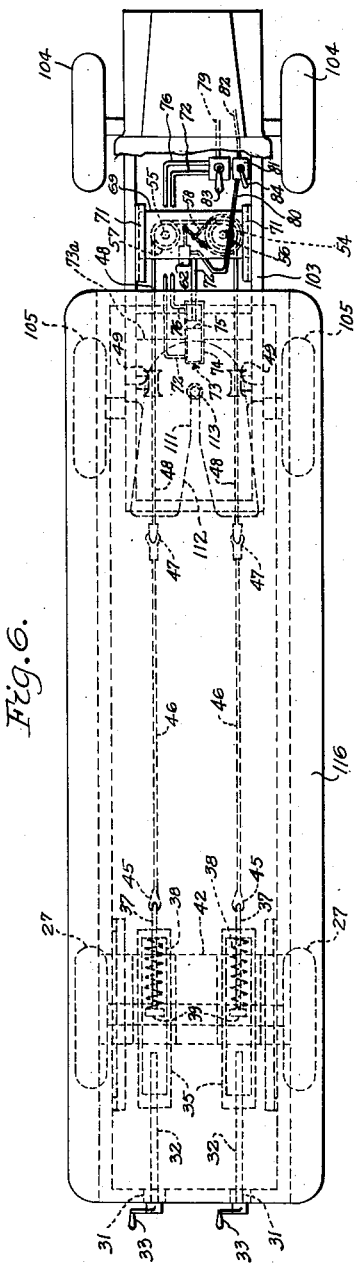
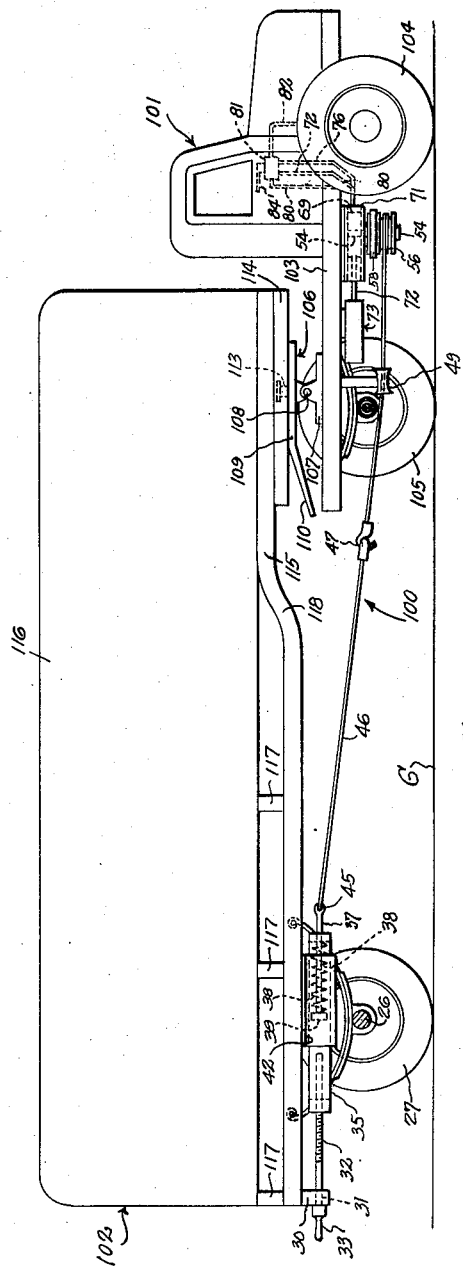
Inventor
Marshall D. Koontz
Barthel & Bugbee
Attorneys Patented Oct. 12, 1954

2,691,533

UNITED STATES PATENT OFFICE 2,691,533

LOAD-DISTRIBUTING ARRANGEMENT FOR TRACTOR-TRAILER COMBINATIONS

Marshall D. Koontz, Detroit, Mich.

Application June 16, 1950, Serial No. 168,530

5 Claims. (Cl. 280—405)

This invention relates to tractor-trailer vehicles and, in particular, to load and traction equalizing arrangements for such vehicles.

One object of this invention is to provide a load-distributing arrangement for tractor-trailer vehicles whereby the load of a semi-trailer may be adjusted relatively to the tractor or towing vehicle so as not only to lighten the load applied by the semitrailer to the coupling device between the vehicles but also to vary the load distribution between the front and rear wheels of the towing vehicle or tractor and consequently to vary the traction exerted by the different wheels.

Another object is to provide a load-distributing arrangement of the foregoing character for tractor-trailer vehicles wherein the arrangement prevents "jack-knifing" or "nose-diving" of the tractor or towing vehicle and improves the steering qualities of the latter vehicle by enabling more of the load to be transferred from the rear wheels to the front wheels thereof.

Another object is to provide a load-distributing arrangement of the foregoing character for tractor-trailer vehicles wherein mechanism is provided for exerting a pull upon the rearward end of the towed vehicle or semi-trailer, the tension element being connected to a point intermediate the front and rear wheels of the towing vehicle or tractor so as to lighten the load otherwise exerted on the coupling device between the vehicles.

Another object is to provide a load-distributing arrangement of the foregoing character for tractor-trailer vehicles wherein mechanism is also provided for braking the tension element so as to restrain its motion.

Another object is to provide a load-distributing arrangement of the foregoing character for tractor-trailer vehicles wherein the tension element is also provided with one or more compensating springs and also preferably with an adjustment by which the force of the compensating springs upon the tension element may be varied.

Another object is to provide a load-distributing arrangement of the foregoing character for tractor-trailer vehicles wherein the load proportionately sustained by each wheel of the towing vehicle may be adjusted to satisfy maximum load requirements of State highway laws.

In the drawings:

Figure 1 is a top plan view, with the towed vehicle partly broken away, of a tractor-trailer combination equipped with the load-distributing and traction-adjusting arrangement, according to one form of the invention;

Figure 2 is a side elevation of the tractor-trailer combination shown in Figure 1, with the tractor or towing vehicle partly broken away;

Figure 3 is a cross-section taken along the line 3—3 in Figure 1, showing details of one of the equalizing springs;

Figure 4 is a top plan view of a modified load-distributing arrangement for a tractor-trailer combination, with the bodies of the towing and towed vehicles removed;

Figure 5 is a view similar to Figure 4, but showing a further modified load-distributing arrangement for a tractor-trailer combination;

Figure 6 is a top plan view of a commercial tractor-trailer combination equipped with the load-distributing arrangement of this invention, with the cab and floor of the tractor omitted;

Figure 7 is a side elevation of a commercial tractor-trailer combination shown in Figure 6; and Figure 8 is a fragmentary side elevation of a still further modified load-distributing arrangement for a tractor-trailer combination.

General arrangement

Hitherto, the operation of towing vehicles or tractors towing heavy loads has been unsatisfactory and frequently dangerous, particularly where the load being towed is a semi-trailer or two-wheeled vehicle having the weight of the forward portion thereof overhanging and pressing down upon the coupling between the vehicles. Since the wheels of such a trailer or towed vehicle are often located rearwardly of the center of the towed vehicle, the load is not balanced equally on opposite sides of the axle but is considerably greater toward the forward end of the towed vehicle. This preponderant load is concentrated upon the coupling device between the towing and towed vehicles and consequently presses downward upon the rearward end of the towing vehicle, tending to raise the forward wheels thereof off the ground around the center line of the rear axle as a fulcrum. This action in turn not only causes a disproportionate amount of the load to be concentrated upon the rear wheels of the towing vehicle, thereby tending to cause so-called "nose-diving," but also dangerously reduces the traction of the front wheels upon the road.

As a consequence of the decreased load upon the front wheels, the towing vehicle becomes difficult to control because the front wheels do not sufficiently engage the road with a firm enough grip to insure proper steering, and for the same reason, the front wheel brakes lose much of their effectiveness. Moreover, this concentration of an excessive amount of the load upon the rear wheels of the towing vehicle often forces the owner to install a set of "helper springs" to counteract the sagging at the rearward end of the towing vehicle. This imbalance or excessive weight upon the rear axle causes accelerated wear upon the rear tires. If there is also a slight difference in air pressure in the tires of the towing vehicle under these conditions, a tendency for the towing vehicle to weave, whip, or oscillate sidewise occurs which is transferred to the towed vehicle, often in a multiplied manner, thus creating a traffic hazard. Occasionally, the coupled vehicles even "jack-knife" under such circumstances, causing a wreck.

The installation of a "dolly" or similar device under the front end of the towed vehicle or trailer, while previously used in an effort to reduce these difficulties, although assisting travel in a forward direction, complicates or restricts the driver's ability to back the vehicle properly. Finally, the concentration of load on the rear wheels of the towing vehicle or tractor often brings the driver into conflict with State laws which limit the weight which each wheel may exert upon the highway, and under such circumstances drivers occasionally lose much valuable time in arranging and redistributing their cargo in the trailer in the effort to reduce the excessive weight and to comply with such State laws.

The present invention eliminates these difficulties in a simple and effective manner by connecting the rearward portion of the towed vehicle to the intermediate or forward portion of the towing vehicle by a flexible tension member, such as a cable or chain, in such a manner as to exert a strong pull between these points remote from the coupling device between the vehicles. The result is that the load on the rear wheels of the towing vehicle is reduced and that on the front wheels thereof increased, thereby giving better traction to the front wheels, with consequently improved steering. Jack-knifing and weaving or yawing of the vehicles is thereby eliminated, and tire wear on the rear tires of the towing vehicle greatly reduced. State laws are thereby readily complied with, and the forward tires of the towing vehicle are made to bear their proper share of the load. If the towing vehicle is power-driven at its front wheels as well as at its rear wheels, the invention increases the efficiency of the vehicle by increasing the traction which the front wheels are able to exert on the road. Steering is also greatly improved. In some of the drawings, a part of the forward portion has been omitted to conserve space.

*First form of a load-distributing arrangement*

Referring to the drawings in detail, Figures 1 to 3 show one form of the load-distributing arrangement of the invention, generally designated 10, as applied to a towing vehicle 11 and a towed vehicle 12, such as a trailer, the vehicles 11 and 12 being hitched together by means of a coupling device, generally designated 13. The towing and towed vehicles 11 and 12 and their coupling device 13 are generally conventional and their details are therefore beyond the scope of the invention, except as they enter into the action of the load-distributing arrangement 10. The towing vehicle 11 has the usual frame 14 with front and rear axles 15 and 16 provided with front and rear wheels 17 and 18 and a body, generally designated 19 of any suitable type. One half 20 of the coupling device 13 is mounted upon an arm or bracket 21 secured to the rearward end of the frame 14, whereas the other half 22 of the coupling device 13 is mounted upon the forward end of a bracket 23 mounted upon the forward end of the frame 24 of the towed vehicle or trailer 12. Mounted on the trailer frame 24 are springs 25 carrying the axle 26, the outer ends of which carry ground wheels 27. A body 28 is mounted upon the frame 24 and may be of any suitable form.

The rearward end of the trailer frame 24 carries a depending cross member 30 having laterally spaced bores 31 in which are journaled screw shafts 32, the rearward ends of which carry hand cranks 33. The threaded portions of the screw shafts 32 are threaded into threaded bores 34 in the rearward ends of rectangular frames or tie structures 35. The forward ends of the frames 35 are smoothly bored as at 36 to slidably receive connection rods 37 which are encircled by compression springs 38 arranged between the forward ends of the frames 35 and heads 39 on the rods 37. Each rectangular frame 35 is slidably mounted in parallel guideways 40 (Figure 3) formed in approximately parallel members 41 extending downward from base plates 42 bolted or otherwise suitably secured as at 43 to parallel longitudinal channel members 44 forming a part of the trailer frame 24. Secured to eyes 45 at the forward ends of the rods 37 are the looped rearward ends of cables or other flexible tension members 46 which are separably connected as at 47 to the rearward ends of a flexible tension member or cable 48 arranged in an approximately U-shaped path and having its rearward portions passing through bell-mouthed tubular guides 49. The rearward ends of the guides 49 are preferably located substantially in a vertical plane passing through the coupling 13, in order to minimize strain upon or stretching of the tension members 46, 48 in executing a turn, and consequently to prevent jack-knifing of the vehicles in executing such turns. The guides 49 are supported by struts 50 and 51 depending from the tractor vehicle frame 14, the struts 51 extending downward from a cross member 52. Also mounted on the frame 14 intermediate the front and rear axles 15 and 16 is a cross member 53.

Mounted on the cross member 53 and extending downward therefrom are pivot shafts or studs 54 and 55 (Figure 1) spaced apart from one another in a lateral direction. Mounted on the pivot shafts 54 and 55 are drums 56 and 57 respectively, these being preferably grooved at their peripheries to receive the cable 48. The drum 56 is encircled by at least one complete turn of the cable 48 in order to cause the cable to tightly engage the drum 56 (Figure 2). Connected to the drum 56 is a brake drum 58 which is engaged by a brake band 59, one end of which is suitably anchored as at 60 to the cross member 53 and the other end of which is connected as at 61 to suitable conventional brake-operating mechanism, generally designated 62 (Figure 1) which extends upward into the cab or driver's compartment of the towing vehicle 11 so as to enable the brake 59 to be applied or released, as desired.

In the operation of the first form of the invention, the operator loads the trailer or towed vehicle 12 as heavily as is desired or feasible. Due to the great overhang of the forward end of the towed vehicle 12, in the absence of the load-distributing arrangement 10 of the present invention, a great part of this load is immediately transferred through the bracket 23 and coupling device 13 to the bracket 21 and rearward end of the towing vehicle frame 14. This pressure not only causes the rear wheels 18 of the towing vehicle 11 to engage the ground or road G with an excessive force, but also tends to push the rearward end of the frame 14 downward around the rear axle 16 as a fulcrum, causing the forward end of the frame 14 and consequently the front axle 15 to rise. This lessens the grip of the front wheels 17 upon the road G and creates the hazardous condition previously referred to.

To redistribute the load so as to place more of it upon the front wheels 17 and reduce the load upon the rear wheels 18, the operator rotates the screw shafts 32 by means of the cranks 33 in order to apply tension to the flexible tension members 46 and 48. This tension applies a vertical component of force to the struts 50, 51, counteracting the downward thrust of the load upon the coupling 13. The greater the tension applied to the flexible tension members 46 and 48, the greater is the proportion of the load applied to the front wheels 17 and subtracted from the rear wheels 18. This action resembles that of a truss, due to the angularity of the portions of the tension members 48 on the opposite sides of the guides 49. The rectangular frames 33 of course slide longitudinally in the guideways 40 (Figure 3) when the screw shafts 32 are rotated, and the compression springs 38 provide a cushioning effect which absorbs road shocks and equalizes the tension on opposite ends of the flexible tension member 48, as transmitted by the flexible tension member 46.

In driving the tractor-trailer combination formed by the towing vehicle 11 and the towed vehicle 12 with the load-distributing arrangement 10 under tension in this manner, the operator finds that steering is greatly improved due to the greater traction obtained by the front wheels 17 upon the ground or road G and he also finds that he is able to stop his vehicles in a shorter space due to the increased efficiency of his front wheel brakes brought about by the increased traction of his front wheels 17. Jack-knifing of the vehicles, nose-diving of the forward or towing vehicle are found to be completely corrected and overcome. By thus suitably manipulating the hand cranks 33 and screw shafts 32, the operator can also redistribute the load upon the wheels of the towing vehicle 11 and thereby comply more easily with State laws governing the maximum permissible load to be applied by each wheel. By applying the brake 59 by the brake operating mechanism 62, the operator can instantly snub any tendency of the vehicles 11 and 12 to jackknife.

*Second form of load-distributing arrangement*

The second form of load-distributing arrangement, generally designated 70 (Figure 4) is for the most part identical with the load-distributing arrangement 10, and similar parts bear similar reference numerals. The load-distributing arrangement 70, however, is additionally provided with means for tightening the tension members 46 and 48 from the driver's seat while under way without halting the vehicles. This consists in replacing the fixed cross member 53 by a slidable member 69 the opposite ends of which are slidably mounted in longitudinal guideways 71 (Figure 4). The slidable member 69 is reciprocated to and fro by the piston rod 72 of a reciprocable hydraulic motor 73 having a double-acting hydraulic cylinder 74 with a piston 75 on the piston rod 72 reciprocable therein. The motor 73 is supported by a cross member 73a of the frame 14. Pressure fluid is transmitted to either of the opposite ends of the cylinder 74 through service pipes 76 and 77 controlled by a four-way valve 78 of conventional design to which pressure fluid is supplied by the pipe 79 connected to a conventional hydraulic pump (not shown). The braking mechanism 62 is also shown as connected by a pipe 80 leading to a control valve 81 supplied with pressure fluid from a supply pipe 82.

The operation of the load-distributing arrangement 70 shown in Figure 4 is generally similar to that of the load-distributing arrangement 10 shown in Figures 1 to 3 inclusive with certain additions. These additions are that by manipulating the hand lever 83 of the control valve 78, the cross member 53 can be moved forward or rearward, thereby tightening or loosening the flexible tension members 46 and 48. In this manner, the load proportionately carried by each pair of wheels can be adjusted instantly from the driver's seat while underway to suit varying conditions of operation. The brake 58 operated by the hydraulic motor 62 is controlled by moving the handle 84 of the control valve 81 to apply or release the brake, as desired, to accomplish the results set forth in the description of the operation of the first form of load-distributing arrangement.

*Third form of load-distributing arrangement*

The load-distributing arrangement, generally designated 90, shown in Figure 5 is similar in principle to the load-distributing arrangement 70 shown in Figure 4, except that the positions of the flexible tension members 46 and 48 are reversed. Since the individual elements are generally similar, however, they are designated with the same reference numerals where substantial identity exists. In Figure 5, the cross member 69 and the guideways 71 in which it is slidably mounted are carried by the frame 24 of the towed vehicle 12 rather than by the frame 14 of the towing vehicle 11. The hydraulic system for moving the slidable member 69 to and fro to tighten or loosen the flexible tension members 46 and 48 is substantially the same as that of Figure 4 with the necessary exception that the pipes 72, 76 and 80 are of course greatly lengthened in order to extend from the rearward end of the towed vehicle 12 to the forward end of the towing vehicle 11 where the driver's seat is located. In order to permit free relative motion between the towing and towed vehicles 11 and 12, flexible conduits 91, 92 and 93 are interposed in the hydraulic fluid conduits 72, 76 and 80 respectively at the locations at the portions thereof extending between the adjacent ends of the two vehicles 11 and 12.

The rods 37, moreover, to which the loop ends 45 of the flexible tension members 46 are connected pass through holes 94 in a cross member 95 against which the springs 38 abut. Instead of having fixed heads 39 as in Figures 1 and 4, the rods 37 of Figure 5 are threaded as at 96 and provided with movable heads 97, the positions of which are adjusted by moving the nuts 98 to and fro along the threaded portions 96, thereby adjusting the force exerted by the compression springs 38. The rectangular frames 35 and their adjusting screwshafts 32 and hand cranks 33 are omitted. It will be evident that these same elements could also be omitted from Figure 4 in the same way.

The operation of the third form of the invention shown in Figure 5 is generally similar to that of the second form shown in Figure 4, except that on the manipulation of the control handle 83 of the control valve 78, pressure fluid is admitted from the supply pipe 79 to the service pipe 72 to move the slidable member 69 forward and slacken the tension members 46 and 48, whereas the admission of pressure fluid to the service pipe 76 moves the slidable member 69 rearwardly and increases the tension on the flexible tension members 46 and 48. The brake 59 is operated in the same manner as in Figures 1 and 4 and for the same purpose.

*Fourth form of load-distributing arrangement*

The fourth form of load-distributing arrangement, generally designated 100 shown in Figures 6 and 7 substantially applies the second form 70 of Figure 4 to a commercial highway tractor and semi-trailer, generally designated 101 and 102 respectively with only minor differences. Consequently, the same reference numerals are employed for the component parts of the arrangement 100, as in the arrangement 70. The tractor 101, which is shown merely diagrammatically since any tractor may be used, consists of a frame 103 having paired front and rear wheels 104 and 105 respectively, and a so-called fifth wheel, generally designated 106, mounted on the upper rearward side of the frame 103. The fifth wheel 106 has a base 107 carrying transverse pivots or trunnions 108 upon which the tilting table 109 with its inclined ramp 110 is tiltably mounted. The table 109 is provided with a central slot 111 with a flared or diverging entrance portion 112 for receiving the usual kingpin 113 which projects downward from and is secured to the kingpin supporting structure 114 secured to the lower forward side of the frame 115 of the semi-trailer 102. The trailer body 116 is mounted on the frame 115, partly on cross members 117 at the rearward portion thereof, the forward portion being bent upward to a higher level as at 118 in order to accommodate the kingpin supporting structure 114.

The operation of the fourth form of load-distributing arrangement 100 is substantially the same as that of the second form shown in Figure 4, with the exception of the different manner of coupling the two vehicles 101 and 102. The coupling and uncoupling procedure, however, is the same as that followed in conventional tractor-trailer operation and as it is well-known to those skilled in the tractor-trailer art, requires no detailed description. Just as in the case of the other forms of the invention, it is of course necessary to uncouple the separable connection 47 between the flexible tension members 46 and 48 before uncoupling the semi-trailer 102 from the tractor 101. It is, of course, assumed that the semi-trailer 102 near its forward end is equipped with a suitable movable prop in order to support the forward end when the vehicles are uncoupled. Such props are well known and the showing of the prop has been omitted so as to simplify the illustration of the load-distributing arrangement 100.

For convenience and conciseness, the words "tractor" and "trailer" or "semi-trailer" have been used in the specification and claims of the present application to denote the towing vehicle and towed vehicle or implement, respectively. It will be understood, however, that the term "tractor" includes any type of towing vehicle and not merely the commercial highway tractor used in hauling semi-trailers.

*Fifth form of load-distributing arrangement*

The fifth form of load-distributing arrangement, generally designated 120 (Figure 8), is generally similar to the first form of the invention shown in Figures 1 to 3 inclusive, except that the mechanical adjustment for altering the tension on the cables 46, 48 is placed forwardly of the semi-trailer axle and is controlled and adjusted from the forward end of the semi-trailer. Consequently, the same reference numerals are employed for the component parts of the load-distributing arrangement 120 as are employed for the load-distributing arrangement 10, except where they differ in details. In the load-distributing arrangement 120, the rectangular frames 35 and their guideways 40 are generally similar in construction to those shown in Figures 1 to 3 inclusive, and similar rods 37 with heads 39 carry similar helical springs 38. The cables 46 are similarly connected at 45 to the rods 37 which similarly pass through bearing bores 36 in the forward ends of the frames 35 and have similar separable connections 47 with the cables 48. Instead of the frames 35 being pulled backward by the screw shaft 32 and cranks 33, operating in threaded portions 34 of the frames 35, from the rear of the semi-trailer, the frames 35 of the load-distributing arrangement 120 are pushed backward by screw shafts 121 threaded through threaded bores 122 in brackets 123 depending from the frame 24. The rearward end 124 of each screw shaft 121 abuts the forward end portion 125 of each frame 35 so as to push it backward or permit it to move forward as the screw shaft 121 is rotated. Couplings 126 connect the screw shafts 121 to operating shafts 127, each shaft 127 being rotatably mounted in a bore 128 in a bracket 129 depending from the forward end of the semi-trailer frame 24. A hand crank 130 is mounted on the forward end of each operating shaft 127 and the shafts 127 preferably carry graduations 131 thereon.

The operation of the fifth form 120 of the invention (Figure 8) requires no additional explanation over that set forth above in connection with Figures 1 to 3 inclusive, except to say that turning the cranks 130 in one direction pushes the frames 35 backward so as to compress the springs 38 and consequently tighten the cables 46, 48. Turning the cranks 130 in the opposite direction permits the springs 38 to push the frames 35 forward, loosening the cables 46, 48. The graduations 131 indicate the amount of motion obtained and consequently indicate the tension obtained on the cables 46, 48. The cranks 130 at the forward end of the semi-trailer 12 in Figure 8 are more conveniently located than the cranks 33 at the rear of the semi-trailer 12 in Figure 1, since the driver does not have to go to the rear of the semi-trailer in order to make the adjustments. It is advisable in Figure 8 to have the points of attachment of the cable 46 located rearwardly of the center of gravity of the semi-trailer so as to obtain the proper distribution of force.

What I claim is:

1. A load-distributing arrangement for tractor-trailer vehicles interconnected by a coupling wherein each vehicle has a coupling end adjacent said coupling and a remote end remote from said coupling, said arrangement comprising a pair of laterally-spaced flexible tension member anchorages mounted on one of said vehicles at a location nearer its remote end than its coupling end, a guide wheel carrier mounted on the other vehicle at a location nearer its remote end than its coupling end, a flexible tension member guide wheel means rotatably mounted on said carrier, and a flexible tension member disposed in an approximately U-shaped path along said vehicles with its free ends secured to said anchorages, said flexible tension member having substantially parallel portions extending from said anchorages along opposite sides of said vehicle and a connecting portion extending between said parallel portions to and around said guide wheel means.

2. A load-distributing arrangement for tractor-trailer vehicles interconnected by a coupling wherein each vehicle has a coupling end adjacent said coupling and a remote end remote from said coupling, said arrangement comprising a pair of laterally-spaced flexible tension member anchorages mounted on one of said vehicles at a location nearer its remote end than its coupling end, a guide wheel carrier mounted on the other vehicle at a location nearer its remote end than its coupling end, a flexible tension member guide wheel means rotatably mounted on said carrier, a flexible tension member disposed in an approximately U-shaped path along said vehicles with its free ends secured to said anchorages, said flexible tension member having substantially parallel portions extending from said anchorages along opposite sides of said vehicle and a connecting portion extending between said parallel portions to and around said guide wheel means, at least one of said anchorages being movably mounted on its respective vehicle, and resilient means yieldingly engaging said movable anchorage and urging said movable anchorage in a direction adapted to tighten said flexible tension member.

3. A load-distributing arrangement for tractor-trailer vehicles interconnected by a coupling wherein each vehicle has a coupling end adjacent said coupling and a remote end remote from said coupling, said arrangement comprising a pair of laterally-spaced flexible tension member anchorages mounted on one of said vehicles at a location nearer its remote end than its coupling end, a guide wheel carrier mounted on the other vehicle at a location nearer its remote end than its coupling end, a flexible tension member guide wheel means rotatably mounted on said carrier, a flexible tension member disposed in an approximately U-shaped path along said vehicles with its free ends secured to said anchorages, said flexible tension member having substantially parallel portions extending from said anchorages along opposite sides of said vehicles and a connecting portion extending between said parallel portions to and around said guide wheel means, both of said anchorages being movably mounted on their respective vehicle, and resilient means yieldingly engaging said anchorages and urging said anchorages in directions adapted to tighten said flexible tension member.

4. A load-distributing arrangement for tractor-trailer vehicles interconnected by a coupling wherein each vehicle has a coupling end adjacent said coupling and a remote end remote from said coupling, said arrangement comprising a pair of laterally-spaced flexible tension member anchorages mounted on one of said vehicles at a location nearer its remote end than its coupling end, a guide wheel carrier movably mounted for longitudinal travel along the other vehicle at a location nearer its remote end than its coupling end, a flexible tension member guide wheel means rotatably mounted on said carrier, a flexible tension member disposed in an approximately U-shaped path along said vehicles with its free ends secured to said anchorages, said flexible tension member having substantially parallel portions extending from said anchorages along opposite sides of said vehicles and a connecting portion extending between said parallel portions to and around said guide wheel means, and mechanism operatively connected to said guide wheel carrier for moving said guide wheel carrier longitudinally along its respective vehicle.

5 A load-distributing arrangement for tractor-trailer vehicles interconnected by a coupling wherein each vehicle has a coupling end adjacent said coupling and a remote end remote from said coupling, said arrangement comprising a pair of laterally-spaced flexible tension member anchorages mounted on one of said vehicles at a location nearer its remote end than its coupling end, a guide wheel carrier mounted on the other vehicle at a location nearer its remote end than its coupling end, a pair of laterally-spaced flexible tension member guide wheels rotatably mounted on said carrier, and a flexible tension member disposed in an approximately U-shaped path along said vehicles with its free ends secured to said anchorages, said flexible tension member having substantially parallel portions extending from said anchorages along opposite sides of said vehicles and a connecting portion extending between said parallel portions to and around said guide wheels.

References Cited in the file of this patent

UNITED STATES PATENTS

| Number | Name | Date |
|---|---|---|
| 1,164,310 | Nilson | Dec. 14, 1915 |
| 1,321,561 | Simmons | Nov. 11, 1919 |
| 1,821,395 | Musselwhite | Sept. 1, 1931 |
| 1,876,498 | Hawkins | Sept. 6, 1932 |
| 2,159,721 | Wright | May 23, 1939 |
| 2,259,923 | Byrne et al. | Oct. 21, 1941 |
| 2,493,874 | Hume | Jan. 10, 1950 |

FOREIGN PATENTS

| Number | Country | Date |
|---|---|---|
| 498,399 | Germany | May 22, 1930 |